United States Patent [19]

Firth

[11] 4,361,333
[45] Nov. 30, 1982

[54] RETORT SEAL MECHANISM WITH INTEGRAL BEARINGS

[75] Inventor: Donald Firth, Los Angeles, Calif.

[73] Assignee: Tosco Corporation, Los Angeles, Calif.

[21] Appl. No.: 243,509

[22] Filed: Mar. 13, 1981

[51] Int. Cl.³ .............................................. F16J 15/34
[52] U.S. Cl. .......................................... 277/12; 277/65;
      277/81 R; 277/83; 308/187.1; 202/222
[58] Field of Search .................... 277/12, 32, 81 R, 82,
      277/83, 65, 93 R, 93 SD, 173, 178; 202/222,
      223; 308/36.1, 187.1, 187.2

[56] References Cited

U.S. PATENT DOCUMENTS

| 1,489,857 | 4/1924 | Stevens . | |
|---|---|---|---|
| 1,802,813 | 4/1931 | Greenwald | 277/65 X |
| 2,253,098 | 9/1941 | Schneider | 263/32 |
| 2,814,511 | 11/1957 | Truax | 286/1 |
| 3,260,530 | 7/1966 | Jelatis et al. | 277/65 X |
| 3,441,259 | 4/1969 | Heyer et al. | 263/34 |
| 3,706,482 | 12/1972 | Crockett | 277/12 X |
| 4,068,854 | 1/1978 | Douglass | 277/178 X |
| 4,071,253 | 1/1978 | Heinen et al. | 277/65 X |
| 4,193,756 | 3/1980 | Leon | 432/3 |

FOREIGN PATENT DOCUMENTS

| 481788 | 9/1929 | Fed. Rep. of Germany | 277/81 |
|---|---|---|---|
| 633231 | 2/1962 | Italy | 277/65 |

*Primary Examiner*—Robert S. Ward, Jr.
*Attorney, Agent, or Firm*—Poms, Smith, Lande & Rose

[57] ABSTRACT

An improved rotating retort seal having integral bearings for aligning the retort seals relative the sealing surface on the rotating vessel portion of the retort. The sealing function and bearing or seal alignment function are separated to extend seal life and improve sealing. Radial alignment bearings and axial alignment bearings are provided for continually positioning the seal assembly housing during sealing surface nutation. The sealing elements, which are fixed relative to the alignment bearings, is thereby continually aligned and realigned in response to sealing surface nutations during retort rotation. The alignment bearings are extended radially outward from the seals on the sealing surface to prevent damage of the bearings by materials processed in the retort. A lubrication passageway is placed between the alignment bearings and seals to provide for common lubrication of both alignment bearings and seals.

15 Claims, 4 Drawing Figures

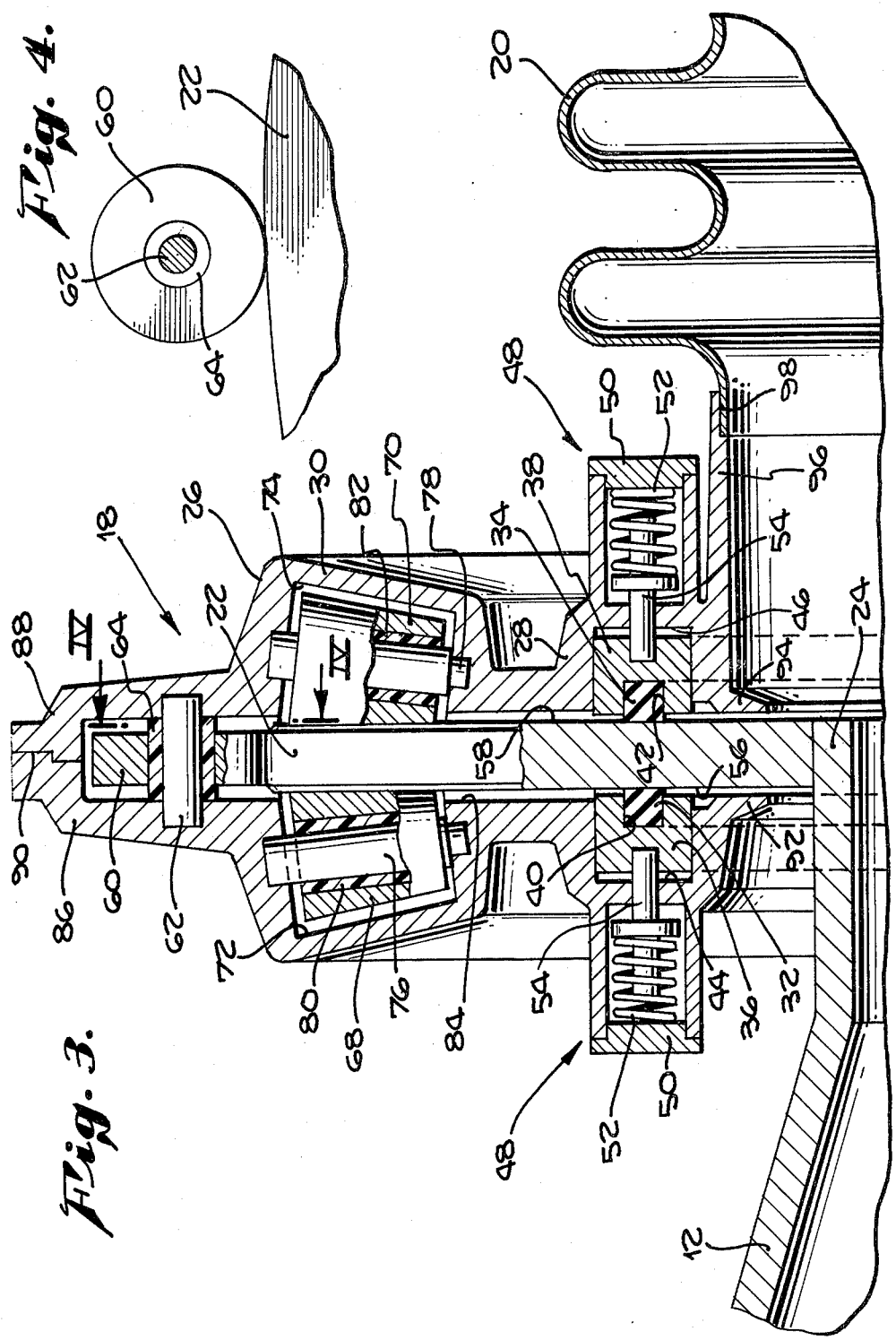

RETORT SEAL MECHANISM WITH INTEGRAL BEARINGS

BACKGROUND OF THE INVENTION

The present invention relates generally to rotating retorts utilized in retorting carbonaceous materials. More specifically, the present invention relates to seal mechanisms for sealing the rotating vessel portion of the rotating retort to the stationary retort portions.

Rotating retorts are well-known and commonly used in the recovery of hydrocarbons from carbonaceous materials such as coal, oil shale, etc. In order to handle the massive quantities of carbonaceous materials processed during hydrocarbon recovery, the rotating retort must necessarily be very large. Because of the large dimensions, sealing of the rotating vessel portion to the stationary retort portions to prevent escape of valuable hydrocarbon gases has continually posed a problem.

Typical attempts at providing a suitable seal for sealing the rotating portion to the stationary portion have included the provision of a sealing surface around the rotating vessel portion to which suitable stationary seals are sealed during rotation. Because of the large dimensions of the rotating vessel portion, it is inherently difficult and commercially unpracticable to provide a sealing surface which does not nutate or otherwise rotate unevenly during rotation of the vessel portion. It has therefore been necessary to provide a retort seal mechanism which will compensate or follow the sealing surface nutations to thereby continually seal the rotating vessel portion to the stationary retort portions.

In order to accommodate the inherent nutation of the rotating vessel sealing surface, the seal mechanism is usually placed in a housing which is flexibly attached to the stationary retort portion so that the seal housing and seals may flexibly follow nutations of the sealing surface.

Although the use of bellows or other flexible connectors has partially solved the problem of allowing the retort seals to follow nutations in the sealing surface, a problem still exists with providing an adequate means for aligning the seal assembly on the sealing surface to provide long term reliable sealing. Specifically, conventional seal assemblies include seals which not only seal to the sealing surface but also align the sealing assembly thereon. These dual purpose seals have reduced life due to the high seal bearing intensity experienced as they continually not only seal to the sealing surface but also continually shift the seal assembly in response to sealing surface nutations. The added forces which act on the seals as they are functioning as alignment bearings, results in increased wear and reduced life of the seals.

It would be desirable to provide a retort sealing mechanism where the "bearing function" of the seals is separated out to lower seal force intensity at the sealing surface to thereby extend seal life and usefulness.

It would further be desirable to provide a rotating retort seal wherein the bearings, bushings, or other means used for aligning the seals relative the sealing surface are sealed off from the retort to prevent contamination and thereby extend bearing life.

SUMMARY OF THE INVENTION

In accordance with the present invention, the above desirable features are provided by a retort seal mechanism with integral bearings. The retort seal mechanism of the present invention, like prior art retort seals, is adapted to seal the rotating vessel portion of a rotating retort to the stationary retort portions. The retort seal mechanism includes seal means for sealing the stationary retort portion to the sealing surface present on the ends of the rotating vessel portion. The sealing surface is typically a radial extending sealing disc integral with the rotating vessel portion. The retort seal mechanism further includes separate seal alignment means for positioning the seal means in sealing position relative the sealing disc during rotation of the rotating vessel. The seal alignment means includes radial alignment bearings for aligning the seals radially on the seal disc and further includes axial alignment bearings for aligning the seals axially relative the seal disc.

As a further feature of the present invention, the retort seals or seal elements are located inwardly of the alignment bearings to thereby seal off the alignment bearings from retort gases, carbonaceous material and other contaminants. Sealing off of the alignment bearings provides for smooth operation and extended life of the alignment bearings. In addition, the alignment bearings house in a suitable alignment bearing housing may be lubricated with suitable lubricant with an added feature of a lubricant passageway for passing lubricant to the retort seal elements to provide lubrication if desired.

All of the above and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 3 is a detailed partial sectional view of FIG. 2 taken in the III—III plane.

FIG. 4 is a detailed side view of a radial alignment bearing.

DETAILED DESCRIPTION OF A PREFERRED EMBODIMENT

Figure 1:
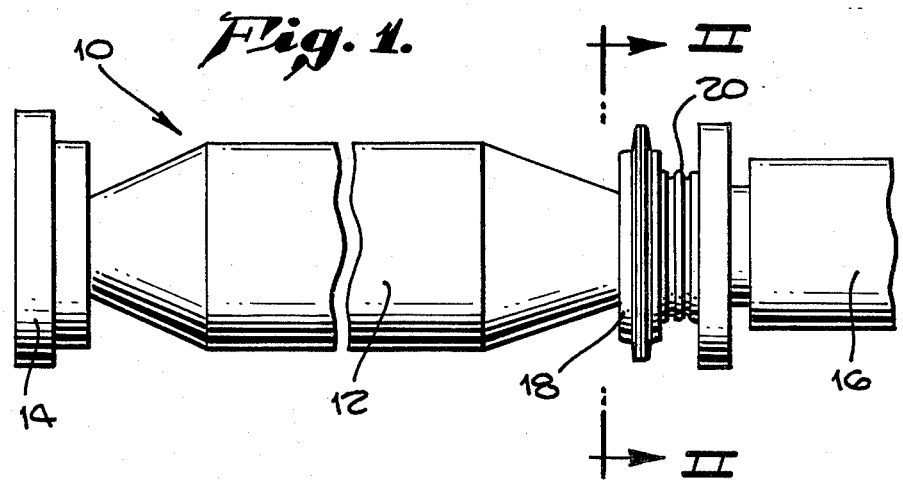
FIG. 1 is a general side view of a typical rotating retort having the preferred seal mechanism of the present invention in place on the right side of the retort.

Referring first to FIG. 1, a typical rotating retort for use in retorting carbonaceous materials is shown generally at 10. The rotating retort 10 includes a rotating vessel portion 12, a left stationary retort portion 14 and a right stationary retort portion 16. The rotating retort 10 is operated in conventional manner according to well-known retorting principles. For example, raw carbonaceous materials such as coal or oil shale is introduced through stationary retort portion 14 into the rotating vessel portion 12. The rotating vessel portion 12 is maintained at a sufficiently high temperature to retort the material to produce product gases and liquids and a retorting residue. The products and residue are then removed from the rotating vessel portion 12 by way of right stationary retort portion 16.

As shown in FIG. 1, the rotating vessel portion 14 is sealed to right stationary retort portion 16 by the preferred retort seal mechanism 18 of the present invention. The left stationary retort portion is also sealed to the rotating vessel portion by suitable sealing means not shown. The retort seal mechanism 18 is flexibly connected to the right stationary retort portion by flexible boot 20. The flexible boot 20 allows the retort seal mechanism 18 to nutate relative the right stationary retort portion 16 in response to nutations of the rotating vessel portion 12.

Now referring to FIG. 3, the preferred retort seal mechanism is shown generally at 18. The retort seal mechanism 18 is designed to seal to a sealing surface such as seal disc 22. The seal disc 22 is integrally attached to the rotating vessel 12 at its outer end 24. The seal disc 22 may be formed integrally from the rotating vessel portion 12 or may be sealingly attached to welding or other suitable means to provide a gas and liquid-tight junction.

Preferably, the retort seal mechanism 18 includes a single seal assembly housing 26. The seal assembly housing may be conveniently viewed as two separate elements, a seal housing 28 and an alignment housing 30. Although it is preferred to combine the seal housing 28 and alignment housing 30 into a single integral seal assembly housing 26, the present invention may suitably be carried out with separate seal housing and alignment housings provided they are rigidly fixed relative each other to provide common movement in response to seal disc 22 nutation.

Seal means for effectively sealing the stationary retort portion 16 to the seal disc 22 includes a left or first seal element 32 and a right or second seal element 34. The seal elements 32 and 34 are annular rings or ribs which form continuous sealing circles on opposing sides of the seal disc. 22. The seal elements 32 and 34 may be made from any suitable material for sealing such as rubber, synthetic elastomers or other sealing materials found suitable as seals in retorting operations. The left and right seal elements 32 and 34 are each housed within a seal casing 36 and 38 respectively. The seal casings 36 and 38 are also annular in shape with each having a seal seating surface 40 and 42 for receiving and mounting the annular seal elements 32 and 34. The seal casings 36 and 38 are slidably housed within seal chambers 44 and 46 within the seal housing 28. The seal casings 36 and 38 seat matingly within seal chambers 44 and 46 so that gases and liquids and other debris cannot escape by being vented around the seal casings 36 and 38 through seal chambers 44 and 46.

Figure 2:
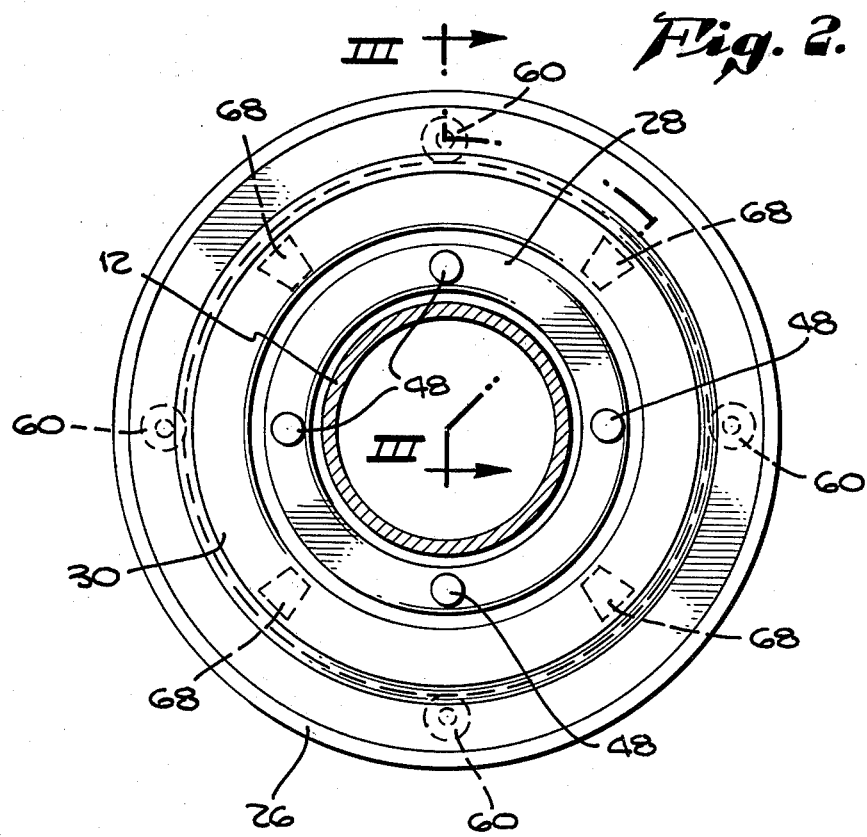
FIG. 2 is a cross-sectional view of FIG. 1 taken in the II—II plane.

Biasing means for biasing the annular seals 32 and 34 into sealing engagement with the seal disc 22 are provided by a series of spring biasing assemblies 48 placed at spaced locations annularly around the seal assembly housing 26 as best shown in FIG. 2. The spring biasing assemblies 48 include a spring housing 50, a spring 52 for biasing bias rod 54 against the seal casings 36 and 38 to promote sealing of the seal elements 32 and 34 on their respective sealing surfaces 56 and 58 of seal disc 22. As will be realized, without separate aligning means to keep the seal elements 32 and 34 aligned with the nutating seal disc 22 during rotation, the seal elements 32 and 34 are subject to varying degrees of seal bearing intensity as they continually maintain the seal assembly housing 26 in alignment with the nutating seal disc 22. The seal alignment means as set forth below alleviates this problem.

Seal alignment means in accordance with the preferred embodiment are provided by alignment bearings housed within alignment housing 30. More specifically, a plurality of radial alignment bearings 60 are provided which are spaced annularly around the seal assembly housing 26 as shown in FIG. 2. The radial alignment bearings 60 are mounted rotatably to the seal assembly housing 26 by way of axle 62. A bushing 64 or suitable bearing is provided to allow smooth and friction free rotation of the radial alignment bearing about axle 62. The radial alignment bearings 60 position the seal elements 32 and 34 radially on the seal disc 22.

Axial means for aligning the seal elements 32 and 34 relative the seal disc 22 are provided by a plurality of tapered roller bearings, half of which are shown in phantom at 68 in FIG. 2. As shown in FIG. 3, a left tapered bearing 68 is provided on the left or first side of the seal disc 22 while a second tapered roller bearing 70 is provided for aligning and contacting with the right or second side 58 of the seal disc 22. The tapered bearings 68 and 70 are housed within bearing chambers 72 and 74 respectively. The tapered roller bearings 68 and 70 are mounted therein on suitable axles 76 and 78. As with the radial alignment bearing 60, the axial bearings 68 and 70 are provided with bushings 80 and 82 or suitable bearings to allow smooth relatively friction free rotation of the tapered roller bearings 68 and 70.

A fill hole may be provided in the alignment housing portion 30 of the seal assembly housing 26 to allow lubrication of the alignment bearings 60, 68 and 70 when desired. Any suitable grease lubricant or oil lubricant may be utilized. A lubricant passageway 84 is provided on either side of seal disc 22 to allow lubricant to flow into contact with seal elements 32 and 34. In this way, the seal elements 32 and 34 may be continually lubricated as well as the alignment bearings 60, 68 and 70.

Preferably, the seal assembly housing 26 is made up of two separate halves 86 and 88. The two seal assembly housing halves 86 and 88 are joined together as shown at 90. The housing halves 86 and 88 may be held together at joint 90 by any suitable releasable means such as clamps or bolts and nuts. By providing the seal assembly housing 26 in two halves 86 and 88, the seal assembly housing 26 may be removed from the seal disc 22 simply and conveniently by disconnecting the two halves. This allows easy access for maintenance and other purposes to the alignment bearings and seals.

The seal assembly housing 26 is further provided on its lower end with scraper ribs 92 and 94. These scraper ribs, although not providing a liquid and gas-tight seal, do prevent the buildup of large accumulations of solid material near the seal elements 32 and 34.

The seal assembly housing 26 is further provided with mounting cylinder 96 which includes a sleeve surface 98 into which the flexible bellows or boot 20 is sealingly inserted. This configuration thereby provides sealing transfer of product gases and liquids from the rotating vessel portion 12 through mounting cylinder 96 and bellows 20 to the right stationary retort portion 16 and further downstream processing.

In operation, as the rotating vessel is supported and rotated by well-known bearing and gear drive mechanisms (not shown), the seal disc 22 will nutate from side to side and up and down. The plurality of radial and axial alignment bearings continually follow the seal disc thereby aligning the seal elements thereon. In this way, seal element life is extended and sealing characteristics improved over prior art sealing assemblies where no separate means are provided for aligning the seals relative the seal disc during nutation.

Having thus described an exemplary embodiment of the present invention, it should be noted by those skilled in the art that the within disclosures are exemplary only and that various other alternatives, adptations and modifications may be made within the scope of the present invention. Thus, by way of example and not of limitation, instead of a seal disc being used for a sealing surface, a flat annular sealing surface may be desirable where a single seal element seals thereon with alignment bearings suitably situated to align the seal element during retort rotation and inherent nutation. Accordingly, the present invention is not limited to the specific embodiments as illustrated herein.

What is claimed is:

1. A retort seal mechanism adapted to seal the rotating vessel portion of a rotating retort to the stationary retort portions, wherein the rotating vessel includes radially extending disc sealing surfaces at each end, said retort seal mechanism comprising:

seal means for sealing the stationary retort portion to the sealing surface of said rotating vessel, said seal means including a seal housing flexibly attached sealingly to the stationary retort portion to allow aligning movement of said seal housing relative said sealing surface, said seal housing having one or more seal elements for sealing to said sealing surface; and seal alignment means for positioning the seal means in sealing position relative said sealing surface during rotation of the rotating vessel, said seal alignment means including an alignment housing fixed relative said seal means, said alignment housing having sealing surface follower means for continually aligning said alignment housing relative said sealing surface in response to nutations of said sealing surface during rotation of said rotating vessel, said sealing surface follower means including radial positioning means for radially aligning said alignment housing relative said disc and axial positioning means for axially aligning said alignment housing relative said disc, whereby said seal means, being fixed relative said alignment housing, is continually aligned with said sealing surface.

2. A retort seal mechanism according to claim 1 wherein said radially positioning and axial positioning means include roller bearings.

3. A retort seal mechanism according to claim 2 wherein said axial positioning means includes tapered roller bearings.

4. A retort seal mechanism according to claim 1 in which the seal housing and alignment housing are integrally formed to provide a single assembly housing.

5. A retort seal mechanism according to claim 4 in which the radial and axial positioning means are displaced radially outward of said seal elememts.

6. A retort seal mechanism according to claim 4 in which said seal elements are positioned on both sides of said disc said seal elements being biased towards the sealing surfaces defined by said disc.

7. In a retort seal mechanism for sealing the rotating vessel portion of a rotating retort to the stationary retort portions, said rotating vessel including radially outwardly extending seal discs having sealing surfaces on each side wherein annular seal elements are provided for sealing to said sealing surface, said seal elements being carried sealingly within a seal housing said seal housing being mounted sealingly to said stationary retort portions, the improvement comprising:

seal alignment means for aligning the seal elements relative said sealing surfaces during rotation of the rotating vessel.

8. An improved retort seal mechanism according to claim 7 wherein said seal alignment means includes an alignment housing fixed relative said seal housing, said alignment housing having seal disc follower means for continually aligning said alignment housing relative said seal disc during rotation of said rotating vessel, whereby said seal elements and seal housing, being fixed relative said alignment housing, are continually aligned with said seal disc during said rotation.

9. An improved retort seal mechanism according to claim 8 wherein said seal housing and said alignment housing are integrally connected to form an integral seal assembly housing.

10. An improved retort seal mechanism according to claim 9 in which said seal disc follower means includes a plurality of radial roller bearings for aligning the seal assembly housing, a plurality of first axial roller bearings on a first side of said seal disc and a plurality of second axial roller bearings on a second side of said seal disc, said first and second axial roller bearings providing axial alignment of said seal assembly housing on said seal disc.

11. An impoved retort seal mechanism according to claim 10 wherein said seal element is displaced radially inward of said radial and axial roller bearings whereby said roller bearings are sealed off from said rotating vessel and stationary portions.

12. An improved retort seal mechanism according to claim 11 in which means are provided for biasing the seal elements toward sealing contact with the seal disc.

13. An improved retort seal mechanism according to claim 12 in which said seal assembly housing is a split case housing having a first half on the first side of said seal disc and a second half on the second side of said seal disc, the split case housing further including means for releasably securing the split case halves together about said seal disc.

14. An improved retort seal mechanism according to claim 13 wherein said alignment housing is filled with lubricant to lubricate said roller bearings.

15. An improved retort seal mechanism according to claim 14 in which lubricant passageway means are provided for allowing passage of lubricant from said alignment housing to said seal elements to lubricate the seal elements.

* * * * *